US012123588B1

(12) United States Patent
Tsai

(10) Patent No.: US 12,123,588 B1
(45) Date of Patent: Oct. 22, 2024

(54) LIGHT-EMITTING FAN CAPABLE OF BEING CONNECTED WITH MULTIPLE SETS FOR COMPUTERS

(71) Applicant: SUPER FLOWER COMPUTER INC., New Taipei (TW)

(72) Inventor: Tsung Yen Tsai, New Taipei (TW)

(73) Assignee: SUPER FLOWER COMPUTER INC., New Taipei (TW)

( * ) Notice: Subject to any disclaimer, the term of this patent is extended or adjusted under 35 U.S.C. 154(b) by 0 days.

(21) Appl. No.: 18/211,759

(22) Filed: Jun. 20, 2023

(51) Int. Cl.
*F21V 33/00* (2006.01)
*F21V 23/06* (2006.01)

(52) U.S. Cl.
CPC .......... *F21V 33/0096* (2013.01); *F21V 23/06* (2013.01)

(58) Field of Classification Search
None
See application file for complete search history.

(56) References Cited

U.S. PATENT DOCUMENTS 10,184,478 B2 * 1/2019 Lai ...................... F04D 25/0613
10,690,336 B1 * 6/2020 Chen ......................... G06F 1/20
11,686,467 B1 * 6/2023 Yuan ..................... F04D 25/166 362/96
11,962,220 B2 * 4/2024 Melo, Jr. ............... F04D 25/166
2011/0116234 A1 * 5/2011 Ye ...................... H05K 7/20172 454/236
2017/0331346 A1 * 11/2017 Lai ...................... F04D 25/0693
2020/0208832 A1 * 7/2020 Chen .................. H05K 7/20172
2023/0188001 A1 * 6/2023 Melo, Jr. ................. F04D 25/08

OTHER PUBLICATIONS

DE-202021102818-U1 + machine translation (Year: 2021).*

* cited by examiner

*Primary Examiner* — Juan G Flores
(74) *Attorney, Agent, or Firm* — Chun-Ming Shih; LANWAY IPR SERVICES

(57) ABSTRACT

A light-emitting fan contains: a frame, a motor, a fan blade, a slidably electrical connector, and a power connector. The frame includes a first electrical connection portion and a second electrical connection portion. The first electrical connection portion has multiple first electrodes, and the second electrical connection portion has multiple second electrodes. The frame further includes multiple retainers and multiple coupling portions. The slidably electrical connector includes a slider and multiple third electrodes. The slidably electrical connector is slid to a first position and a second position. The power connector includes a slide casing, and the slide casing has multiple fourth electrodes and a power cable configured to connect with an external power supply.

12 Claims, 8 Drawing Sheets

LIGHT-EMITTING FAN CAPABLE OF BEING CONNECTED WITH MULTIPLE SETS FOR COMPUTERS

TECHNICAL FIELD

The present invention relates to a light-emitting fan, and more particularly to the light-emitting fan which is capable of being connected with multiple sets for computers.

BACKGROUND

A conventional light-emitting fan capable of being connected with multiple sets for computers is disclosed in TW Utility Model No. M580203, and the conventional light-emitting fan contains a body and a fan blade fixed on a center of the body. The body has a light emitting zone formed on a top thereof and at least two sides of the fan blade, a socket and a first connector which are arranged on a first side of the body, and a second connector arranged on a second side of the body. The socket is electrically connected with the first connector, the second connector, the fan blade, and the light-emitting zone, such that after supply power, the fan blade of the body is driven by the power to rotate and the light-emitting zone illuminates lights. Furthermore, the fan blade of another body is driven to rotate and the light-emitting zone illuminates lights, after the first connector of the body is connected with the second connector of another body.

However, the first connector and the second connector are oxidized or abraded easily to cause poor electrical contact and failed power or signal transmission.

Conventional light-emitting fans are disclosed in TW Utility Model No. M635856 and connected, wherein a respective one light-emitting fan contains a fan blade received in a frame, a light guiding ring connected with a light emitter and surrounding the fan blade, a circuit board and a retainer which are arranged on the frame, wherein the circuit board is electrically connected with the respective one light-emitting fan and the light emitter. The respective one light-emitting fan also contains a connector with a seat and a coupling circuit, wherein the seat has a pair of hooks, and the coupling board has a first contact leg and a second contact leg, the seat is defined between two adjacent light-emitting fan blades, the pair of hooks are proximate to the retainer, such that the first contact leg is electrically connected with the circuit board, and the second contact leg is electrically connected with the circuit board of another light-emitting fan.

However, structure strengthens of the conventional light-emitting fans is weak and cannot be turn on/off solely.

The present invention has arisen to mitigate and/or obviate the afore-described disadvantages.

SUMMARY

The primary aspect of the present invention is to provide a light-emitting fan which is capable of being connected with multiple sets for computers and when the slidably electrical connector is slid to the second position, multiple light-emitting fans are connected; when the slidably electrical connector is slid to the first position, at least one light-emitting fan is stopped connecting with the other light-emitting fan.

To obtain above-mentioned aspect, a light-emitting fan provided by the present invention contains: a frame, a motor, a fan blade, a slidably electrical connector, and a power connector.

The frame includes a first electrical connection portion and a second electrical connection portion which are located on a first side of the frame. The first electrical connection portion has multiple first electrodes, and the second electrical connection portion has multiple second electrodes which are electrically connected with the multiple first electrodes of the first electrical connection portion in parallel. The frame further includes multiple retainers fixed on a second side thereof adjacent to the first side of the frame and configured to connect with a frame of another light-emitting fan, and the frame includes multiple coupling portions formed on a third side thereof opposite to the multiple retainers of the second side of the frame and configured to match with multiple retainers of another light-emitting fan.

The motor and the fan blade are mounted on the motor and are located on a center of the frame, and the motor is electrically connected with of the first electrical connection portion.

The slidably electrical connector includes a slider and multiple third electrodes mounted on the slider. The slider is slidably mounted on the frame and is located on the first side of the frame with the first electrical connection portion and the second electrical connection portion. The slidably electrical connector is slid to a first position and a second position. The multiple third electrodes of the slidably electrical connector of a second position are electrically connected with the multiple second electrodes of the second electrical connection portion of the frame and are connected with the multiple first electrodes of the first electrical connection portion of another frame. The slidably electrical connector of the first position is electrically connected with the multiple second electrodes of the second electrical connection portion of the frame.

The power connector includes a slide casing, and the slide casing has multiple fourth electrodes and a power cable configured to connect with an external power supply. The power connector is removably fixed on the frame, the multiple fourth electrodes of the power connector are electrically connected with the multiple first electrodes of the first electrical connection portion, and the power cable is electrically connected with the multiple fourth electrodes.

Preferably, the multiple retainers are a slidable tenon, and the multiple coupling portions are a chute.

Preferably, the multiple retainers are a dovetail tenon, and the multiple coupling portions are a dovetail slot.

Preferably, the slidably electrical connector includes a light emitter which is electrically connected with the multiple third electrodes.

Preferably, the power connector includes another light emitter which is electrically connected with the multiple fourth electrodes.

Preferably, the light emitter is Light Emitting Diodes (LEDs), and the LEDs of the light emitter are single-color LEDs and multi-color LEDs.

Preferably, the multiple first electrodes and the multiple second electrodes are a pogo-pin electrode or the multiple first electrodes and the multiple second electrodes are a snap dome, and the multiple third electrodes and the multiple fourth electrodes are a contact finger.

Preferably, a number of the multiple first electrodes, the multiple second electrodes, the multiple third electrodes and the multiple fourth electrodes is at least two.

Preferably, the slider of the slidably electrical connector and the slide casing of the power connector are slid on the frame by moving in a dovetail slot.

Preferably, the slider has two wings extending from two sides of the slidably electrical connector respectively, and the frame includes the two accommodation grooves defined thereon to mate with the two wings.

Preferably, the light-emitting fan further comprises a terminal cap configured to shield the multiple second electrical connection portion of another light-emitting fan which is unused.

Since a plating layer of the contact finger is oxidized or abraded easily to cause poor electrical contact and failed power or signal transmission, the slidably electrical connector and the power connector are spaced from each other so as to replace the slidably electrical connector and the power connector respectively when being oxidized or abraded after a period of using time, thus prolong service lift of the light-emitting fan. Also, when the slidably electrical connector is slid to the second position, multiple light-emitting fans are connected. When the slidably electrical connector is slid to the first position, at least one light-emitting fan is stopped connecting with the other light-emitting fan.

DETAILED DESCRIPTION

Figure 1:
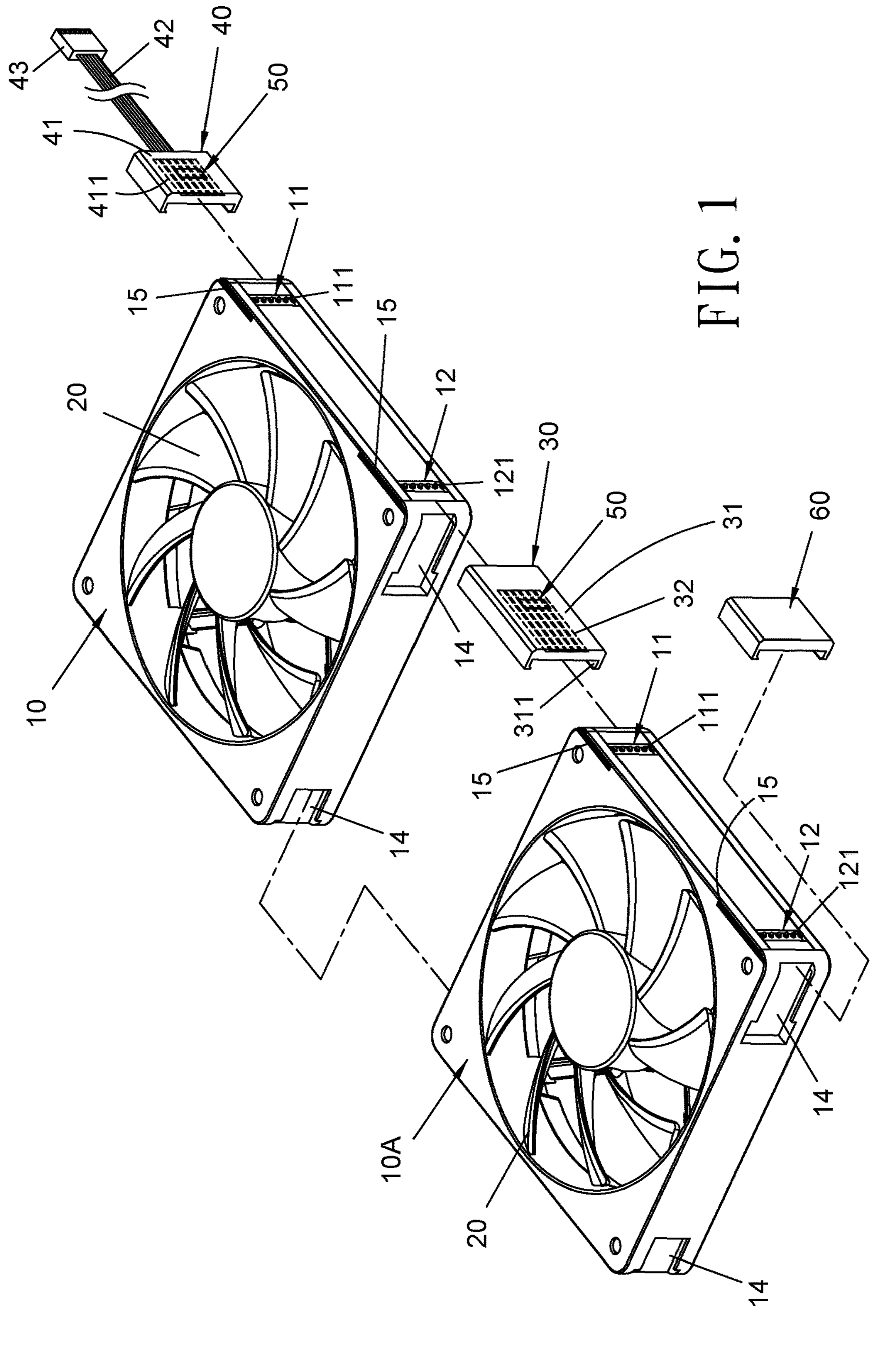
FIG. 1 is a perspective view showing the exploded components of a light-emitting fan capable of being connected with multiple sets for computers according to a preferred embodiment of the present invention.
Figure 2:
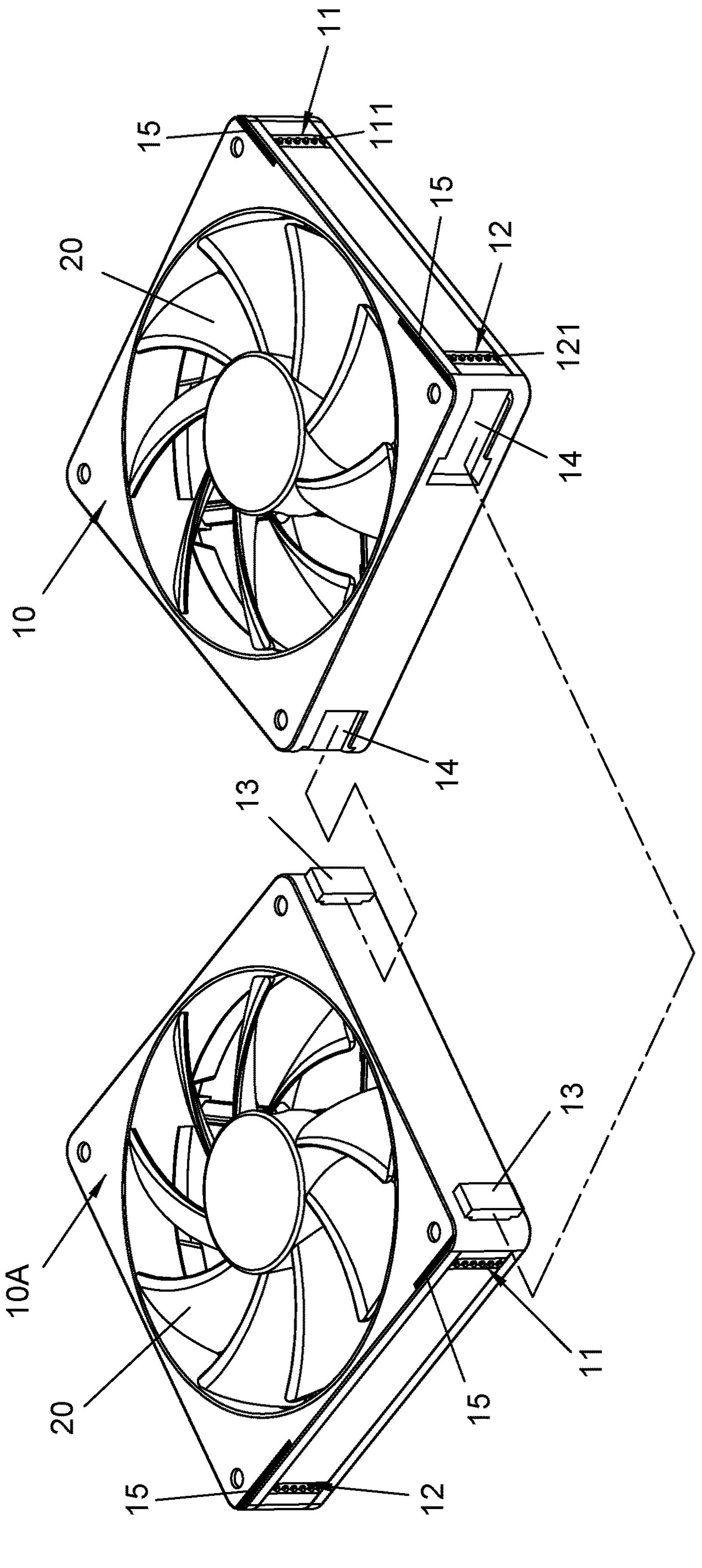
FIG. 2 is a perspective view showing the application of the light-emitting fan capable of being connected with the multiple sets for the computers according to the preferred embodiment of the present invention.

FIG. 1 is a perspective view showing the exploded components of a light-emitting fan capable of being connected with multiple sets for computers according to a preferred embodiment of the present invention. FIG. 2 is a perspective view showing the assembly of the light-emitting fan capable of being connected with the multiple sets for the computers according to the preferred embodiment of the present invention. The light-emitting fan comprises: a frame 10, a motor (not shown), a fan blade 20 mounted on the motor, a slidably electrical connector 30, and a power connector 40, wherein the motor is located below and shielded by the fan blade 20.

The frame 10 includes a first electrical connection portion 11 and a second electrical connection portion 12 which are located on a first side of the frame 10, wherein the first electrical connection portion 11 has multiple first electrodes 111, and the second electrical connection portion 12 has multiple second electrodes 121 which are electrically connected with the multiple first electrodes 111 of the first electrical connection portion 11 in parallel by using multiple wires in the frame 10. The frame 10 includes multiple retainers 13 fixed on a second side thereof adjacent to the first side of the frame 10 and configured to connect with a frame 10A of another light-emitting fan, as shown in FIG. 2. The frame 10 further includes multiple coupling portions 14 formed on a third side thereof opposite to the multiple retainers 13 of the second side of the frame 10 and configured to match with multiple retainers 13 of another light-emitting fan, thus connecting the frames 10, 10A of two light-emitting fans. As illustrated in FIG. 2, the multiple retainers 13 are a slidable tenon, and the multiple coupling portions 14 are a chute. In another preferred embodiment, the multiple retainers 13 are a dovetail tenon, and the multiple coupling portions 14 are a dovetail slot. The motor and the fan blade 20 are located on a center of the frame 10, wherein the motor is electrically connected with two first electrodes 111 of the first electrical connection portion 11.

Figure 3:
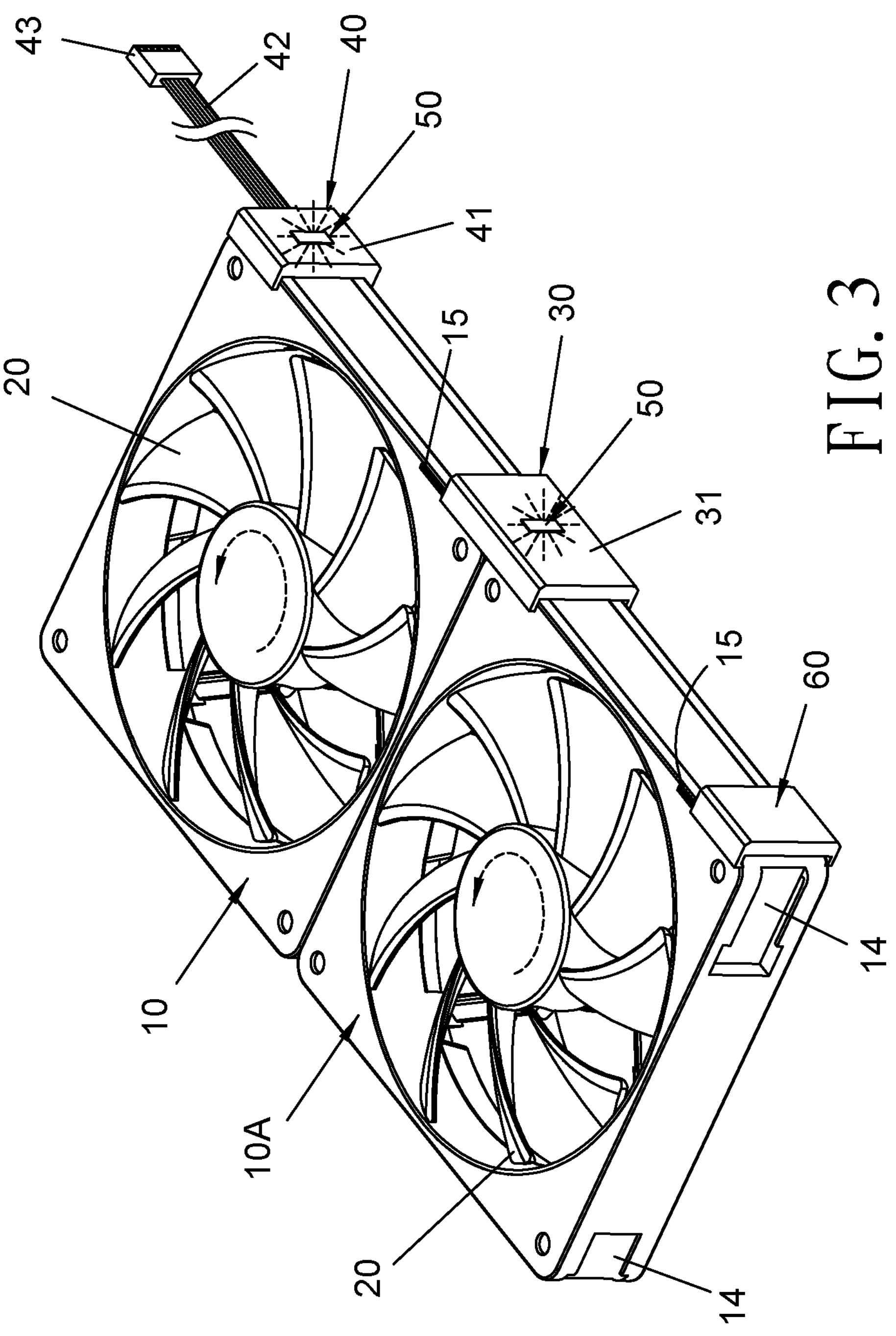
FIG. 3 is another perspective view showing the application of the light-emitting fan according to the preferred embodiment of the present invention.
Figure 4:
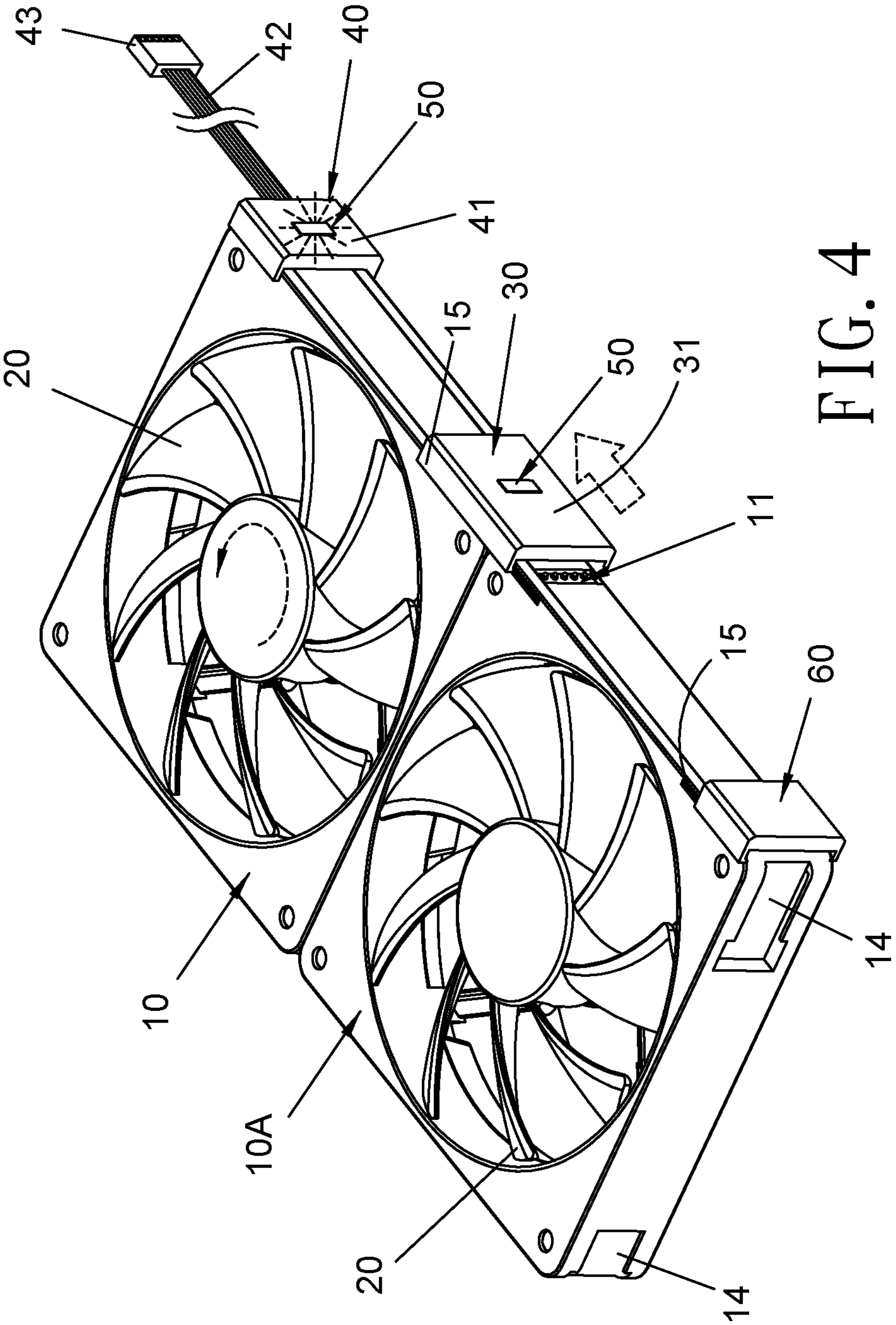
FIG. 4 is also another perspective view showing the application of the light-emitting fan according to the preferred embodiment of the present invention.
Figure 5:
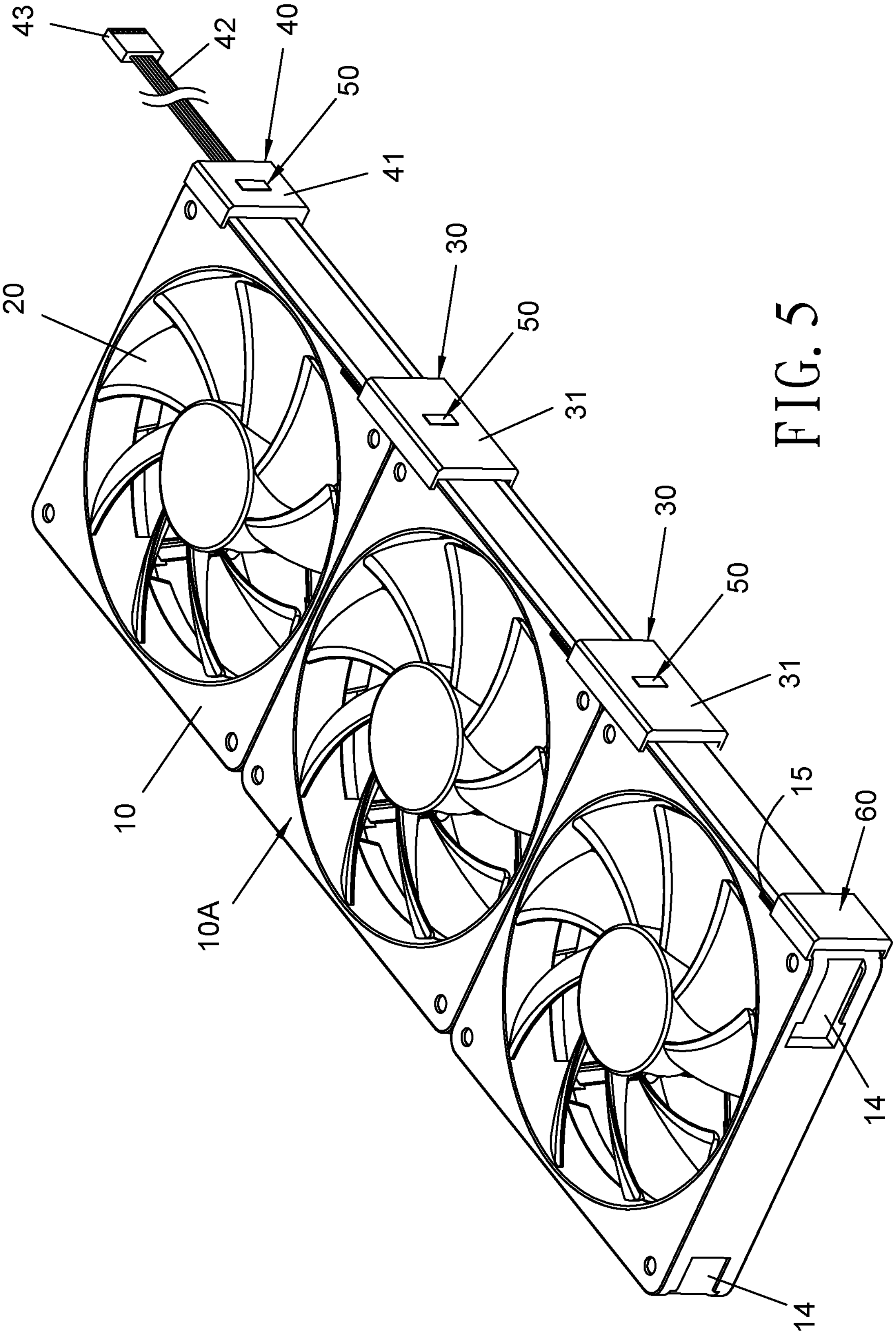
FIG. 5 is still another perspective view showing the application of the light-emitting fan according to the preferred embodiment of the present invention.

The slidably electrical connector 30 includes a slider 31 and multiple third electrodes 32 mounted on the slider 31, wherein the slider 31 is slidably mounted on the frame 10 and is located on the first side of the frame 10 with the first electrical connection portion 11 and the second electrical connection portion 12, the slidably electrical connector 30 is slid to a first position (as shown in FIG. 4) and a second position (as illustrated in FIG. 3), wherein the multiple third electrodes 32 are opposite to the slider 31 and faces to the frame 10 (denoted by a dotted line of FIG. 1). Referring to FIG. 3, the multiple third electrodes 32 of the slidably electrical connector 30 of a second position are electrically connected with the multiple second electrodes 121 of the second electrical connection portion 12 of the frame 10 and are connected with the multiple first electrodes 111 of the first electrical connection portion 11 of another frame 10A. With reference to FIG. 4, the slidably electrical connector 30 of the first position is electrically connected with the multiple second electrodes 121 of the second electrical connection portion 12 of the frame 10. The slidably electrical connector 30 is configured to transmit power and signal(s) and is a switch to turn on/off the power. FIG. 5 is another perspective view showing the application of the light-emitting fan according to the preferred embodiment of the present invention, wherein three light-emitting fans are connected by sliding the slidably electrical connector 30. When the slidably electrical connector 30 is slid to the second position, multiple light-emitting fans are connected. When the slidably electrical connector 30 is slid to the first position, at least one light-emitting fan is stopped connecting with the other light-emitting fan.

The light-emitting fan further comprises a terminal cap 60 configured to shield the multiple second electrical connection portion 12 of another light-emitting fan which is unused. Referring to FIG. 3, when two light-emitting fans are connected, the second electrical connection portion 12 of a second light-emitting fan of the two light-emitting fans is unused and is shielded by the terminal cap 60. Also, the terminal cap 60 is slidably received in a respective one of two accommodation grooves 15 of the frame 10.

The power connector 40 includes a slide casing 41, and the slide casing 41 has multiple fourth electrodes 411 and a power cable 42, wherein the power connector 40 is removably fixed on the frame 10, and the multiple fourth electrodes 411 of the power connector 40 are electrically connected with the multiple first electrodes 111 of the first electrical connection portion 11. A first end of the power cable 42 is electrically connected with the multiple electrodes 411, and the power cable 40 includes a plug 43 (such as a 4-pin plug) or a socket (such as 4-pin socket) configured to connect with an external power supply. The plug 43 or the socket of the power connector 40 is con configured to connect with computer mainboard.

In another preferred embodiment, the slidably electrical connector 30 includes a light emitter 50 which is electrically connected with the multiple third electrodes 32. When the external power supply supplies the power to drive the motor, the light emitter 50 is also driven by the external power supply to illuminate the lights, such that a user is capable of judging whether the external power supply operates or is failed. The light emitter 50 is Light Emitting Diodes (LEDs). For example, the LEDs of the light emitter 50 are single-color LEDs and multi-color LEDs. In another preferred embodiment, the power connector 40 includes another light emitter 50 which is electrically connected with the multiple fourth electrodes 411.

In another preferred embodiment, the multiple first electrodes 111 and the multiple second electrodes 121 are a pogo-pin electrode, as shown in FIG. 1. In another embodiment, the multiple first electrodes 111 and the multiple second electrodes 121 are a snap dome, and the multiple third electrodes 32 and the multiple fourth electrodes 411 are a contact finger. Since a plating layer of the contact finger is oxidized or abraded easily to cause poor electrical contact and failed power or signal transmission, the slidably electrical connector 30 and the power connector 40 are spaced from each other so as to replace the slidably electrical connector 30 and the power connector 40 respectively when being oxidized or abraded after a period of using time, thus prolong service lift of the light-emitting fan.

In another preferred embodiment, a number of the multiple first electrodes 111, the multiple second electrodes 121, the multiple third electrodes 32, and the multiple fourth electrodes 411 is at least two. In addition, the multiple first electrodes 111, the multiple second electrodes 121, the multiple third electrodes 32, and the multiple fourth electrodes 411 are configured to transmit the power so as to drive the motor and the light emitter 50. In another embodiment, the multiple first electrodes 111, the multiple second electrodes 121, the multiple third electrodes 32, and the multiple fourth electrodes 411 are configured to transmit the power and the signal(s).

Figure 6:
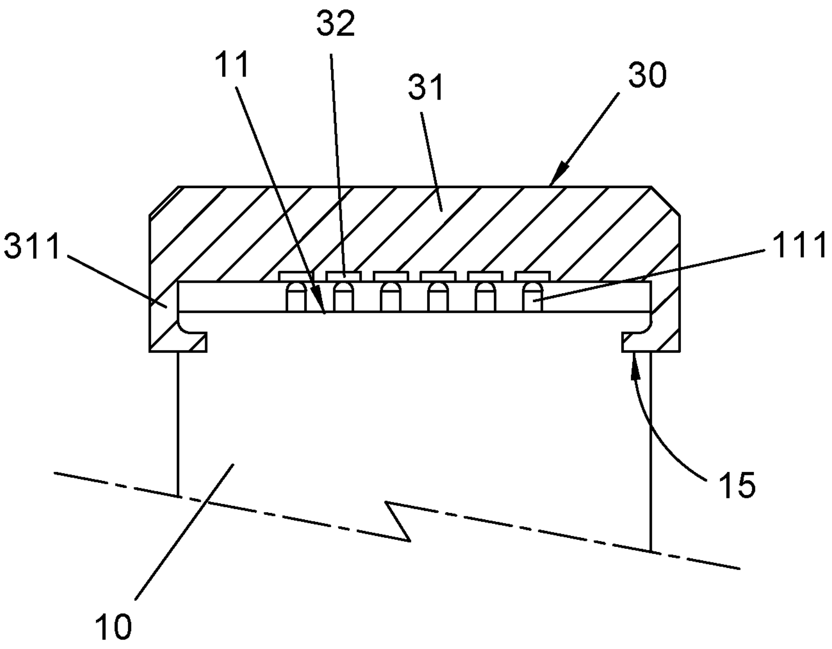
FIG. 6 is a cross sectional view showing the assembly of a part of the light-emitting fan according to another preferred embodiment of the present invention.
Figure 7:
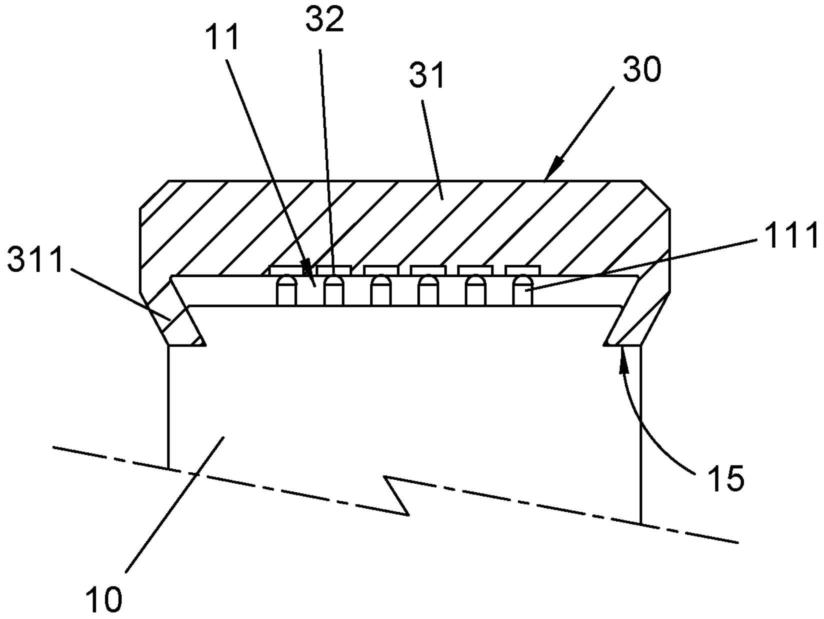
FIG. 7 is a cross sectional view showing the assembly of a part of the light-emitting fan according to another preferred embodiment of the present invention.

In another preferred embodiment, the slider 31 of the slidably electrical connector 30 and the slide casing 41 of the power connector 40 are moved in a dovetail slot. Taking the slider 31 of the slidably electrical connector 30 for example, as shown in FIGS. 6 and 7, the slider 31 has two wings 311 extending from two sides of the slidably electrical connector 30 respectively, and the frame 10 includes the two accommodation grooves 15 defined thereon to mate with the two wings 311, wherein the slider 31 and the slide casing 41 are injection molded from plastic so that the two wings 311 of the slider 31 are engaged in the two accommodation grooves 15 easily, and the slider 31 of the slidably electrical connector 30 and the slide casing 41 of the power connector 40 are slid in and removed from the two accommodation grooves 15 easily.

Figure 8:
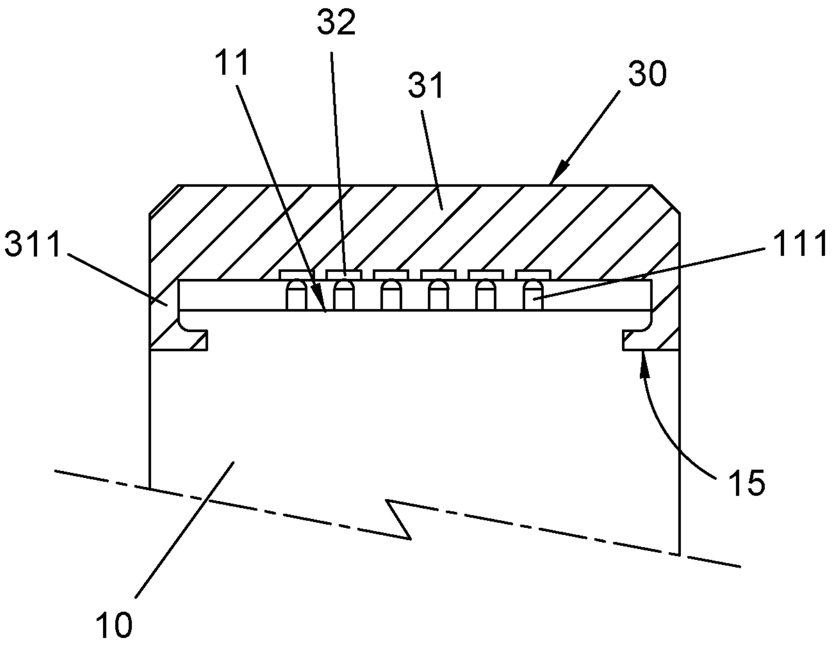
FIG. 8 is a cross sectional view showing the assembly of a part of the light-emitting fan according to another preferred embodiment of the present invention.

With reference to FIG. 8, in another preferred embodiment, a width of the slider of the slidably electrical connector 30 is equal to a width of a cross section of the frame 10. In other words, the slider 31 flushes with the frame 10.

Figure 9:
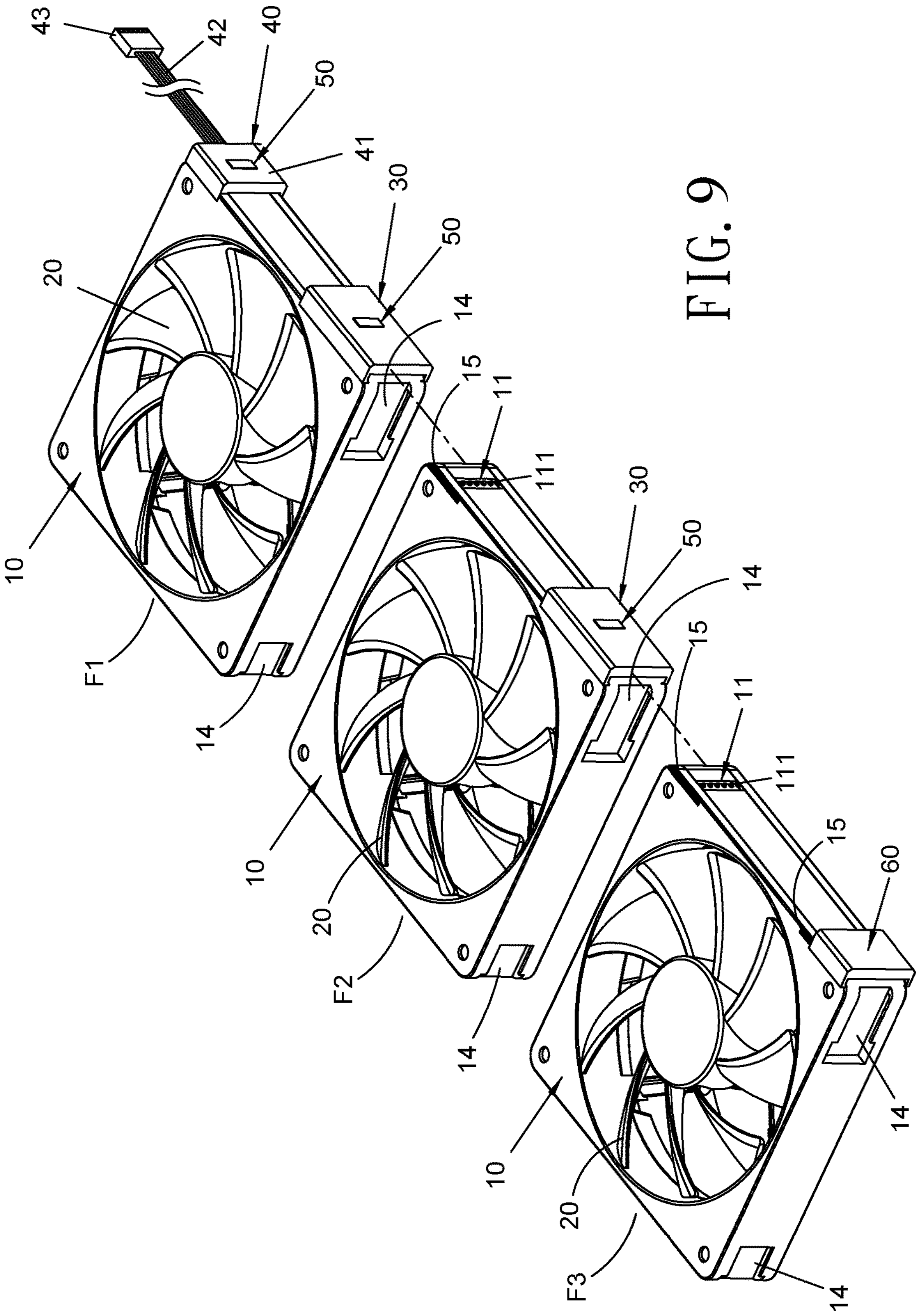
FIG. 9 is a perspective view showing another application of the light-emitting fan according to the preferred embodiment of the present invention.

Referring further to FIG. 9, in another application, the multiple light-emitting fans are not connected. The first light-emitting fan is electrically connected with the external power supply to acquire the power or to electrically connect with an external signal to control an emitting color of the light-emitting fan. The first light-emitting fan F1 includes the power connector 40 and the slidably electrical connector 30, the second light-emitting fan F2 includes another slidably electrical connector 30, and the third light-emitting fan F3 does not include the power connector 40 and the slidably electrical connector 30, wherein the second electrical connection portion 12 of the third light-emitting fan F3 has the terminal cap 60, such that after the first, second, third light-emitting fans F1, F2, F3 are connected, the slidably electrical connector 30 of the first light-emitting fan F1 are moved to the second position, thus electrically connecting the first, second, third light-emitting fans F1, F2, F3 in parallel to send the signal(s) easily.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A light-emitting fan comprising:

a frame including a first electrical connection portion and a second electrical connection portion which are located on a first side of the frame, the first electrical connection portion having multiple first electrodes, and the second electrical connection portion having multiple second electrodes which are electrically connected with the multiple first electrodes of the first electrical connection portion in parallel, wherein the frame further includes multiple retainers fixed on a second side thereof adjacent to the first side of the frame and configured to connect with another frame of another light-emitting fan, and the frame includes multiple coupling portions formed on a third side thereof opposite to the multiple retainers of the second side of the frame and configured to match with multiple retainers of the another light-emitting fan;

a motor and a fan blade mounted on the motor, wherein the motor and the fan blade are located on a center of the frame, and the motor is electrically connected with the first electrical connection portion;

a slidably electrical connector including a slider and multiple third electrodes mounted on the slider, wherein the slider is slidably mounted on the frame and is located on the first side of the frame with the first electrical connection portion and the second electrical connection portion, the slidably electrical connector is slid to a first position and a second position, wherein the multiple third electrodes of the slidably electrical connector in the second position are electrically connected with the multiple second electrodes of the second electrical connection portion of the frame and connected with the multiple first electrodes of the first electrical connection portion of the another frame, and the slidably electrical connector in the first position is electrically connected with the multiple second electrodes of the second electrical connection portion of the frame; and a power connector including a slide casing, and the slide casing having multiple fourth electrodes and a power cable configured to connect with an external power supply, wherein the power connector is removably fixed on the frame, the multiple fourth electrodes of the power connector are electrically connected with the multiple first electrodes of the first electrical connection portion, and the power cable is electrically connected with the multiple fourth electrodes.

2. The light-emitting fan as claimed in claim 1, wherein the multiple retainers are a slidable tenon, and the multiple coupling portions are a chute.

3. The light-emitting fan as claimed in claim 1, wherein the multiple retainers are a dovetail tenon, and the multiple coupling portions are a dovetail slot.

4. The light-emitting fan as claimed in claim 1, wherein the slidably electrical connector includes a light emitter which is electrically connected with the multiple third electrodes.

5. The light-emitting fan as claimed in claim 1, wherein the power connector includes another light emitter which is electrically connected with the multiple fourth electrodes.

6. The light-emitting fan as claimed in claim 4, wherein the light emitter is Light Emitting Diodes (LEDs).

7. The light-emitting fan as claimed in claim 5, wherein the another light emitter is Light Emitting Diodes (LEDs).

8. The light-emitting fan as claimed in claim 1, wherein the multiple first electrodes and the multiple second electrodes are a pogo-pin electrode or the multiple first electrodes and the multiple second electrodes are a snap dome, and the multiple third electrodes and the multiple fourth electrodes are a contact finger.

9. The light-emitting fan as claimed in claim 1, wherein a number of the multiple first electrodes, the multiple second electrodes, the multiple third electrodes and the multiple fourth electrodes is at least two.

10. The light-emitting fan as claimed in claim 1, wherein the slider of the slidably electrical connector and the slide casing of the power connector are slid on the frame by moving in a dovetail slot.

11. The light-emitting fan as claimed in claim 1, wherein the slider has two wings extending from two sides of the slidably electrical connector respectively, and the frame includes two accommodation grooves defined thereon to mate with the two wings.

12. The light-emitting fan as claimed in claim 1, wherein the light-emitting fan further comprises a terminal cap configured to shield the multiple second electrical connection portion of the another light-emitting fan which is unused.

* * * * *